United States Patent [19]
Weiss

[11] Patent Number: 5,672,070
[45] Date of Patent: Sep. 30, 1997

[54] PLUG CONNECTION FOR TWO PAIRS OF BUSBARS

[75] Inventor: Rudolf Weiss, Erlangen, Germany

[73] Assignee: Siemens Aktiengesellschaft, München, Germany

[21] Appl. No.: 507,484

[22] PCT Filed: Feb. 10, 1994

[86] PCT No.: PCT/DE94/00136

§ 371 Date: Aug. 23, 1995

§ 102(e) Date: Aug. 23, 1995

[87] PCT Pub. No.: WO94/19845

PCT Pub. Date: Sep. 1, 1994

[30] Foreign Application Priority Data

Feb. 23, 1993 [DE] Germany ............... 9302586 U

[51] Int. Cl.⁶ ............................................. H01R 4/60
[52] U.S. Cl. .............................. 439/213; 439/819
[58] Field of Search ......................... 439/213, 786, 439/819, 214, 801, 815; 174/88 B; 403/338, 335, 363, 341

[56] References Cited

U.S. PATENT DOCUMENTS 3,701,301  10/1972  Weimer ..................... 439/213

FOREIGN PATENT DOCUMENTS 10 32 822  6/1958  Germany.
17 90 182  1/1972  Germany.
22 42 580  10/1991  United Kingdom.

*Primary Examiner*—Gary F. Paumen
*Attorney, Agent, or Firm*—Kenyon & Kenyon

[57] ABSTRACT

A plug connection for two pairs of busbars is described. A plug connection for two pairs of busbars is provided, with one free end of one pair of the busbars being formed as a plug and a free end of the other pair of the busbars being formed as a socket for receiving the plug and being fitted with a clamping device which allows an adjustable clamping force to be applied to the socket. An electrical connection between the two pairs of busbars is thereby provided in which the rails need not be screwed together, thus considerably simplifying assembly and greatly reducing assembly time as compared to known connection means.

11 Claims, 3 Drawing Sheets

PLUG CONNECTION FOR TWO PAIRS OF BUSBARS

FIELD OF THE INVENTION

The present invention relates to a plug connection for connecting two pairs of busbars.

BACKGROUND INFORMATION

In a converter device, the rail of the capacitor bank of the intermediate circuit and the rail of the inverter are screwed together. Because of this screw-coupling of the two pairs of busbars to one another, reductions occur in the cross-section area of the busbars in the region of the screw locations, which means these regions are more loaded electrically than the remaining sections of such busbars. Moreover, in the case of some converter devices, the capacitor bank is arranged spatially in front of the inverter, which means the screw locations are poorly accessible. Possibly the rails have to be lengthened in order to be able to make a screw connection, which can have a negative effect on the inductance value of these busbars.

SUMMARY OF THE INVENTION

An object of the present invention is to provide a connection for pairs of busbars which overcomes the problems of known busbar connection means.

The present invention provides a plug connection for two pairs of busbars, with one free end of one pair of the busbars being formed as a plug and a free end of the other pair of the busbars being formed as a socket for receiving the plug and being fitted with a clamping device which allows an adjustable clamping force to be applied to the socket.

By forming one free end of one pair of busbars as a socket for a plug component of another pair of busbars, with the socket being provided with a clamping device in such a way that an adjustable clamping force acts on the socket, the two pairs of busbars can be fitted into each other. With such a plug connection, the screw connections are dropped, which means the assembly can be considerably simplified and accomplished in a much shorter time. The clamping device provides for the necessary contacting of the busbars of these connecting pairs of busbars. Since the clamping device is adjustable, the plug connection according to the present invention can be adjusted in accordance with the contacting required for a particular application.

In one advantageous specific embodiment of the plug connection of the present invention, the clamping device juts out beyond the socket on both sides. Because of this measure, the parts of the pairs of busbars which are fitted into each other do not need to be further altered, since the tension members of the clamping device are arranged outside of the socket. This provides an especially simple plug connection.

In another advantageous specific embodiment of the plug connection of the present invention, the busbars are bent up at the entry to the socket. In this manner, the plug component of the second pair of busbars can be guided more easily into the socket, since these bent-up busbars serve as a catch-and-guide element for the socket.

DETAILED DESCRIPTION

Figure 1:
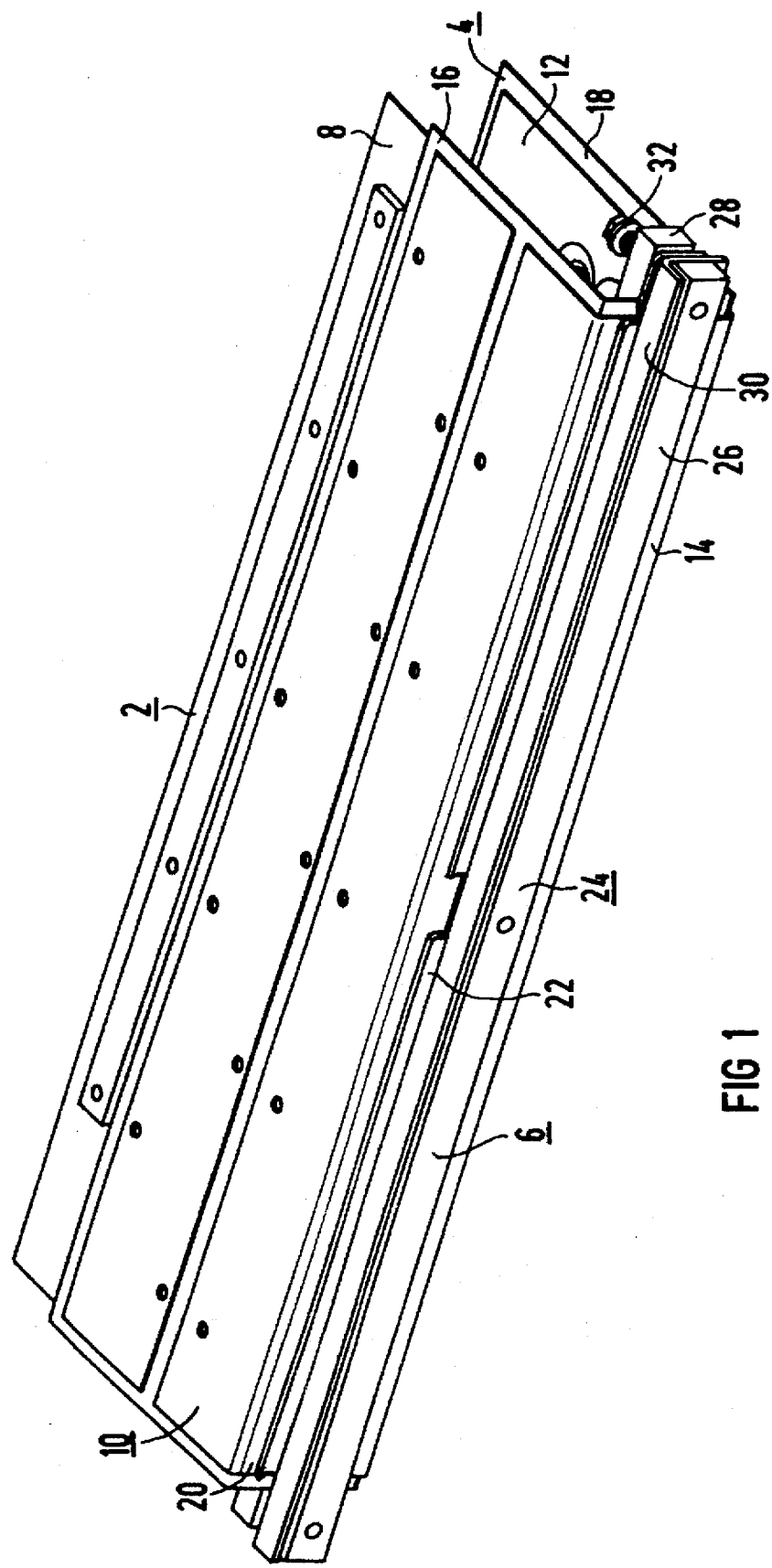
FIG. 1 shows a perspective view of two pairs of busbars that are connected together in accordance with the present invention.

FIG. 1 shows a perspective view from the right above two pairs of busbars 2 and 4 which are connected to one another in an electrically conductive manner by means of the plug connection 6 according to the present invention. The pair of busbars 2 or 4 consists of 2 busbars 8 and 10 or 12 and 14 which are separated from each other by an insulating layer 16 or 18. This insulating layer 16 or 18 juts out beyond the edges of at least one busbar 8 or 10 and 12 or 14 respectively. The overhang of this insulating layer 16 or 18 is dependent upon the value of the voltage applied to the busbars 8 and 10 or 12 and 14 and upon the environment. The overhang serves to enlarge the clearance leakage path between the two busbars 8 and 10 or 12 and 14 so much that no voltage flashover develops.

As can be gathered from FIG. 1, these two low-inductive pairs of busbars 2 and 4 are not screwed together, but rather are connected to one another in an electrically conductive manner by means of a plug connection 6. In doing so, one free end 20 of the one pair of busbars 2 is inserted into a socket 22 of the other pair of busbars 4. This socket 22, which is pictured more precisely in detail in FIG. 2, is provided with a clamping device 24.

The clamping device 24 consists of two clamping members 26 and 28, one insulating member 30 and at least two tension members 32. In addition, this clamping device 24 extends beyond the socket 22 of the pair of busbars 4 on both sides, in each case by a predetermined area, so that these areas can each contain a tension member 32. Due to these constructive measures, the clamping device 24 is attached to the socket 22 in a manner assuring against loss of the attachment. By means of the tension members 32, one tension member being shown in greater detail in FIG. 3, a force is introduced on the outer surfaces of the socket 22 via the clamping members 26 and 28, respectively, so that the socket 22 is prestressed. This clamping force is adjustable by means of the tension members 32 and can be adjusted in accordance with the magnitude of the current flowing in the busbars 8, 12 and 14, 10.

In this depicted specific embodiment of the plug connection 6, each of its two parts are offset from the pair of busbars 2 or 4 belonging to it. This is one possible specific embodiment of the plug connection 6. How the plug connection 6 and the two pairs of busbars 2 and 4 are spatially situated relative to one another is determined by the application or by the spatial location of the objects which are supposed to be provided with rails by means of the two pairs of busbars 2 and 4 connecting them together. In addition, the design of the plug connection 6 in relationship to the pairs of busbars 2 and 4 is dependent upon the insertion operation in the application.

Figure 2:
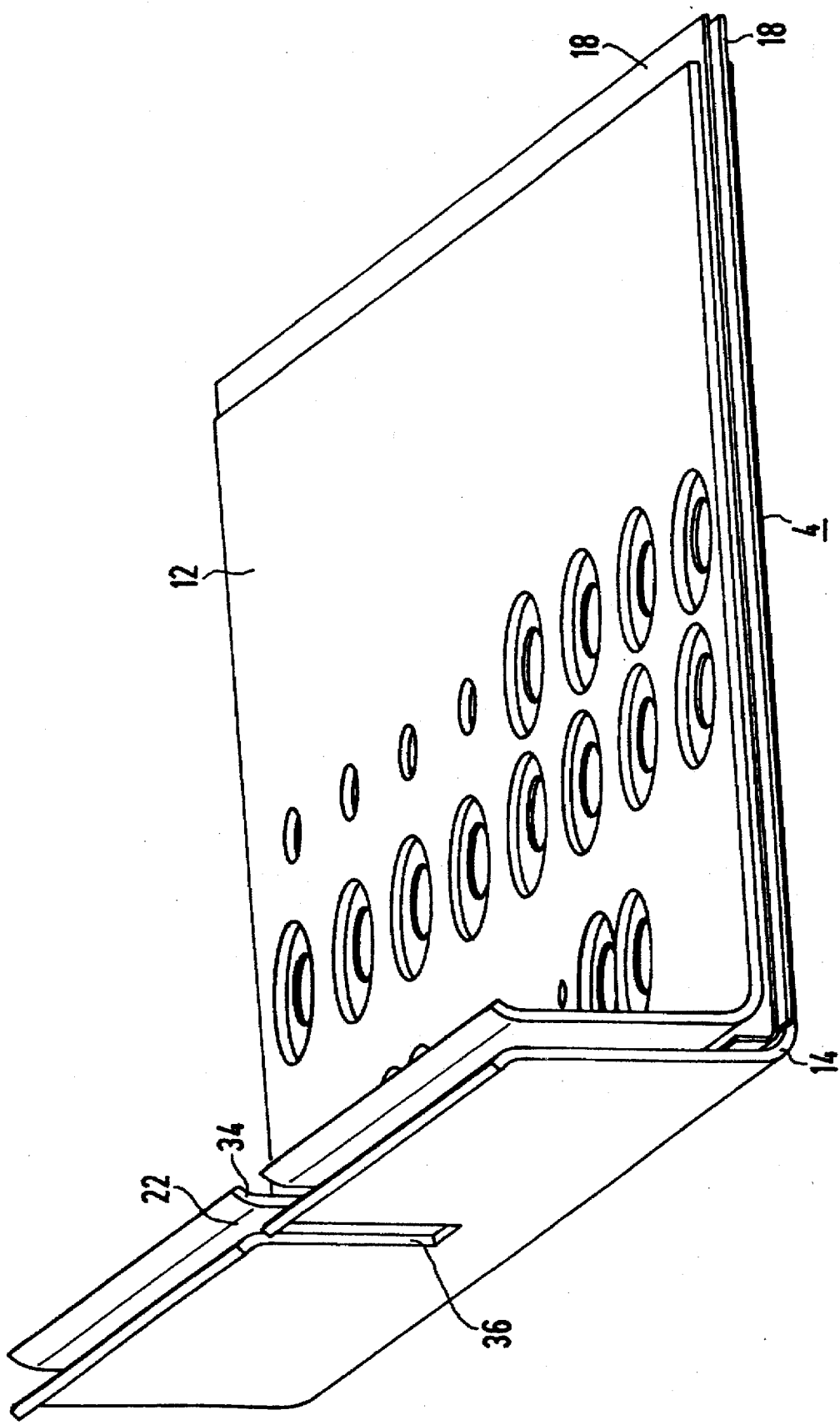
FIG. 2 shows a socket formed in a pair of busbars in accordance with the present invention.

FIG. 2 shows, in detail, the socket 22 of the plug connection 6 according to the present invention. This socket 22 is a component of the pair of busbars 4. One free end of the pair of busbars 4 is shaped to form this socket 22. In the instance shown, the busbars 12 and are each bent at their free ends by 90° in the same direction spatially, the free end of the busbar 14 being bent so that it is displaced corresponding to the thickness of the opening of the socket 22 to be formed. The insulating layer 18 which is arranged between the two busbars 12 and 14 extends into the formed socket 22 at the base. At the entry to the socket 22, the busbars 12 and 14 are each bent open so that a catching area is formed. In addition, the busbars 12 and 14 of this socket 22 are each provided with a rectangular cutout 34 and 36 whose length depends on the plug depth of the connection. These cutouts 34 and 36 are used to receive another tension member 32 of the clamping device 24. That is, a third and each further tension member 32 of the clamping device 24 needs in each case a cutout 34 and 36 in the socket 22. The width of the cutouts 34 and 36, which are arranged spatially parallel to one another, is determined by the form of the tension member 32.

Figure 3:
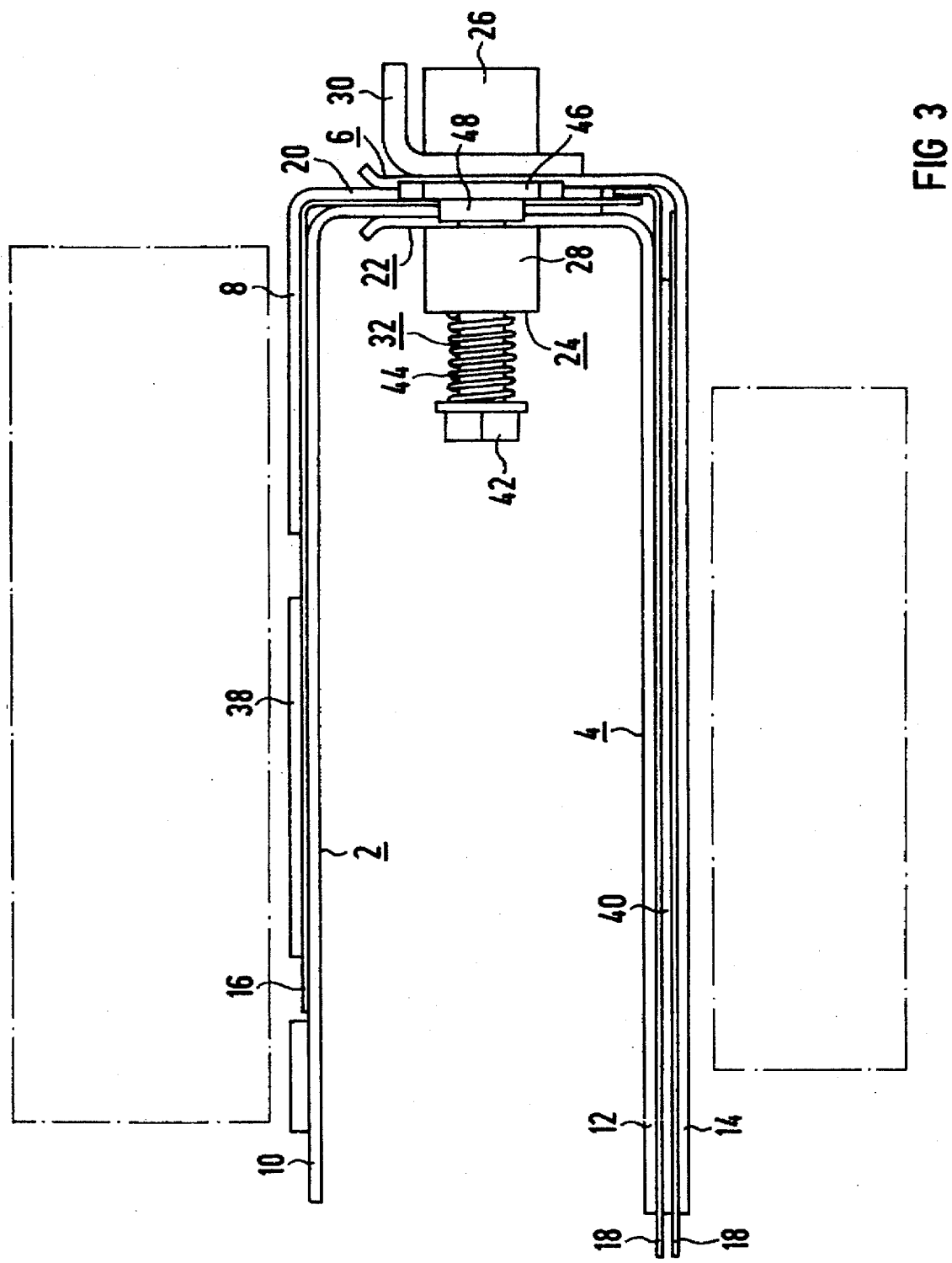
FIG. 3 is a side view from the left of the connected busbars of FIG. 1.

FIG. 3 shows the form of a tension member 32 and the plug connection 6 in detail. This representation is a side view from the left of the representation according to FIG. 1. Above the low-inductive pair of busbars 2 is an area bounded by means of a dot-dash line. In this area, for example, the capacitor bank of a pulse-controlled a.c. converter is arranged, which consists of a plurality of individual capacitors that are electrically connected in parallel and in series. The rail of the capacitor bank is formed by the busbars 8 and 10 and another busbar 38 serves as the auxiliary busbar for the parallel connection and series connection of the capacitors in the capacitor bank. The auxiliary busbar 38 is likewise insulated from the busbar 10 by the insulating layer 16 and is placed spatially parallel to the busbar 8. Below the pair of busbars 4 an area is likewise bounded by means of a dot-dash line. In this area, for example, an inverter of a pulse-controlled a.c. converter is arranged whose semiconductor components are secured on a heat sink. Another busbar 40 is arranged between the busbars 12 and 14 which in each case is insulated from the busbars 12 and 14. These busbars 12, 14 and 40 form the rail of the inverter, the busbars 12 and 14 forming connections on the d.c. current side and the busbar 40 forming a connection on the a.c. current side of the inverter. The rail 2 of the capacitor bank must be connected in an electrically conductive manner to the rail 4 of the inverter, this connection being accomplished by means of the plug connection 6 according to the present invention.

As already mentioned, the plug connection 6 consists of a socket 22 which is provided with a clamping device 24 and a part 20 that is inserted in the socket 22. The clamping device 24 consists of two clamping members 26 and 28, one insulating member 30 and at least two tension members 32. A helical compression spring is provided, for example, as a tension member 32. This helical compression spring 32 consists of a screw 42 which is screwed through a bore hole in the second clamping member 28 and the insulating member 30 into a threaded hole in the first clamping member 26, and a compression spring 44 that is arranged between the screw head and the second clamping member 28. The clamping members 26 and 28 are designed to be bar-shaped. If, for example, these clamping members 26 and 28 are made of iron, then the insulating member 30 ensures that the busbars 12 and 14 or 8 and 10 of the pairs of busbars 4 and 2 are not short-circuited. For this reason, the insulating member is designed, for example with an L-shape, which means the clamping member 26 is sufficiently insulated from the live busbars 8 and 14. However, the insulating member 30 can also be formed with a U-shape, whereby the clamping member 26 is completely insulated. Between the insulating member 30 and the second clamping member 28, the tension member 32 is provided with two separator pieces 46 and 48 made of insulating material. At the same time, the cross-section of the separator piece 48 is smaller compared to the separator piece 46, but greater in depth. The cross-sectional area of the separator pieces 46 and 48 is, for example, square. The difference in size in the cross-section of these separator pieces 46 and 48 depends upon the value of the voltage connected across the busbars 8 and 10. The difference in size in the depth of the separator piece 48 compared to the separator piece 46 is determined by the thicknesses of the busbar 10 and the insulating layer 16 in comparison with the thickness of the busbar 8. Achieved by this shaping of the separator pieces 46 and 48 is that, in each case, the necessary insulating clearances in the area of the tension members 32 between the busbars 8 and 10 or 12 and 14 of the pairs of busbars 2 or 4 are adhered to.

By means of the screws 42 and the compression springs 44 of the tension members 32, the clamping force of the clamping device 24, which acts on the outer sides of the socket 22, can be adjusted. Due to the clamping members 26 and 28, the force of the tension members 32 in each case is distributed nearly uniformly over the entire outside of the socket 22. If the contacting of the busbars 10, 12 and 8, 14 should be improved without at the same time substantially increasing the clamping force of the tension members 32, further tension members 32 can be provided which, for example, are arranged uniformly spaced along the clamping members 26 and 28. In the case of more than two tension members 32, the free ends of the pairs of busbars 2 and 4, which are parts of the plug connection 6, must be provided with corresponding rectangular cutouts 34, 36.

In the handling of the plug connection 6 for two low-inductive pairs of busbars 2 and 4, first of all, a clamping force is adjusted by means of the tension members 32 according to the current that is to flow in the busbars 8, 14, 12 and 10. After that, the pair of busbars 2 having the free end 20, which is the plug component of the plug connection 6, is inserted into the socket 22. In doing so, this insertion operation can be carried out frontally relative to the socket 22 or else by means of a rotating motion. In the case of larger capacitor banks, the rotating motion is advisable in order to force the parts of the plug connection 6 into engagement, since during this sequence of motion, the capacitor bank can support itself on another object, this point of support serving as the point of rotation.

In order to prevent the busbar 8 from becoming skewed with the separator piece 46, the corners of this separator piece 46 are chamfered. It is quite sufficient if, in each case, only the larger separator piece 46 is machined in such a way since in the insertion operation, first of all the busbar 8 comes in contact with the separator piece 46. Thus this separator piece 46 assumes guiding tasks as well.

What is claimed is:

1. A plug connection for busbars comprising:
   a first busbar pair having an end formed as a plug;
   a second busbar pair having an end formed as a socket for receiving the plug; and
   a clamping device for providing an adjustable clamping force on the socket, wherein the clamping device includes two clamping members, an insulating member and at least two tension members.

2. The plug connection according to claim 1, wherein the clamping device juts out beyond opposite sides of the socket.

3. The plug connection according to claim 1, wherein the busbar pairs are bent at the plug and socket ends.

4. The plug connection according to claim 1, wherein the plug connection includes at least three tension elements and the plug and socket ends of the busbar pairs include rectangular cutouts for accommodating the tension elements.

5. The plug connection according to claim 1, wherein the insulating member has an L-shaped cross-section.

6. The plug connection according to claim 1, wherein the clamping members are bar-shaped.

7. The plug connection according to claim 1, wherein each tension member includes a compression spring and a screw.

8. The plug connection according to claim 7, wherein:

the screw of each tension member passes through a hole in the second clamping member and a hole in the insulating member and is coupled with a threaded hole in the first clamping member, and the compression spring of each tension member is mounted between a head of the screw and the second clamping member.

9. The plug connection according to claim 8, further comprising at least one separator piece between the second clamping member and the insulating member.

10. The plug connection according to claim 9, wherein the plug connection comprises at least two separator pieces of different sizes.

11. The plug connection according to claim 9, wherein the separator pieces have a square shape and corners that are chamfered.

* * * * *